March 10, 1936.    M. M. BORDEN    2,033,177
RECORDING MECHANISM
Filed May 5, 1928    2 Sheets-Sheet 1
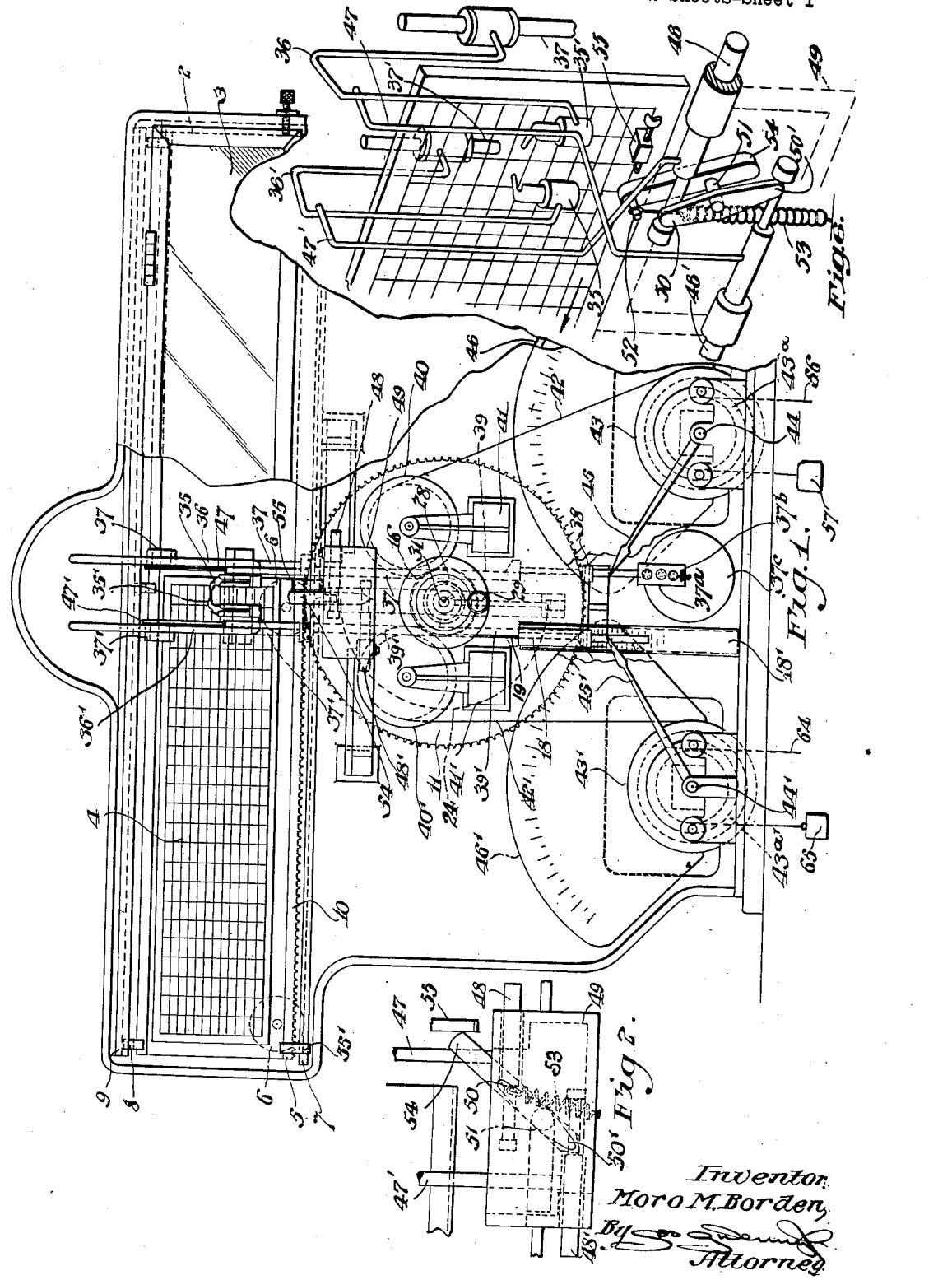
Inventor
Moro M. Borden,
By
Attorney March 10, 1936.  M. M. BORDEN  2,033,177
RECORDING MECHANISM
Filed May 5, 1928  2 Sheets-Sheet 2

Inventor:
Moro M. Borden,
By
Attorney.

Patented Mar. 10, 1936

2,033,177

UNITED STATES PATENT OFFICE 2,033,177

RECORDING MECHANISM

Moro M. Borden, Collingswood, N. J., assignor to Simplex Valve & Meter Company, Philadelphia, Pa., a corporation of Delaware Application May 5, 1928, Serial No. 275,291

9 Claims. (Cl. 234—1)

My invention is designed to provide apparatus for recording any desired number of graphs or lines upon a chart having its entire area continuously exposed during recording and preferably having thereon fixed rectilinear coordinate axes formed by rectangularly arranged ordinates and abscissa. The chart is movable in a flat plane without any bending of the chart relatively to marking mechanism which is preferably disengaged from the chart surface during the return of the chart to its datum position. Relative movements of the marking mechanism on the chart transverse to the feeding movement of the chart holder is preferably effected by actuating mechanism movable in simple functional relation to the characteristics of the medium to be recorded. Indicating and totalizing mechanisms may be conveniently associated with my improved recording mechanism and operated by such actuating mechanism.

By my improvements, records may be made of flow, pressure, temperature or the like directly upon a rectangular coordinate chart having its entire record area exposed to view during the entire period of use, thereby avoiding any necessity for winding the chart upon a roll or about a drum or of having the chart coordinates plotted to compensate for variations in radial distances from the axis of a flat rotary chart.

In the preferred embodiment of my improvements, a chart carrier is reciprocable in a flat, substantially vertical plane to move bodily a chart fixed thereon in one direction under the control of suitable clock mechanism and is returned automatically to the starting or datum point at the expiration of the desired period.

The chart forms a flat record surface and is caused to make a complete transverse motion in any desired period, viz, hourly, daily, weekly or multiples thereof. During such period record lines are formed upon the chart surface by pens or markers, which are preferably actuated by floats so shaped as to convert complex functions of a fluid into a simple movement. The chart may be disposed in a horizontal or inclined plane instead of in a vertical plane, if desired, and its direction of movement may be lateral, perpendicular or in any desired straight line direction.

The characteristic features of my improvements will more fully appear from the following description and the accompanying drawings of an illustrative embodiment thereof.

Figure 3:
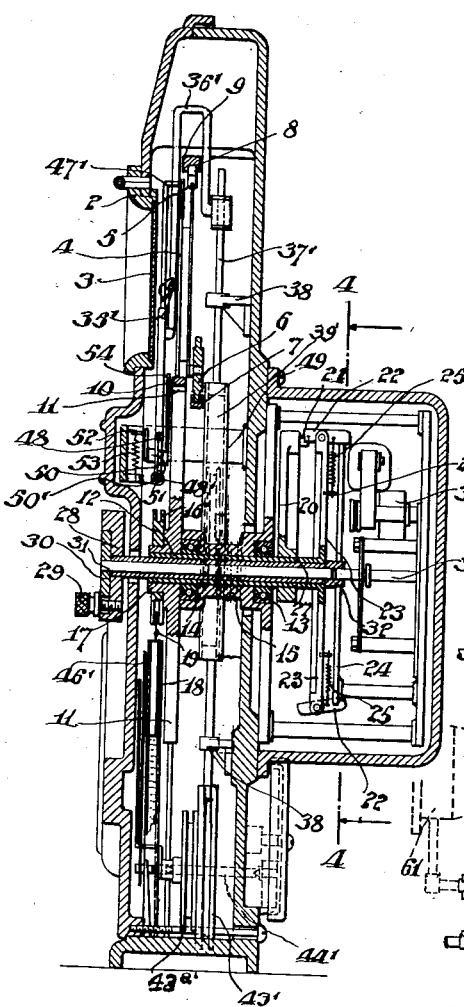
Figure 4:
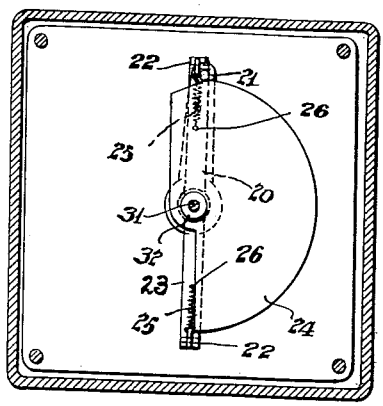
Figure 5:
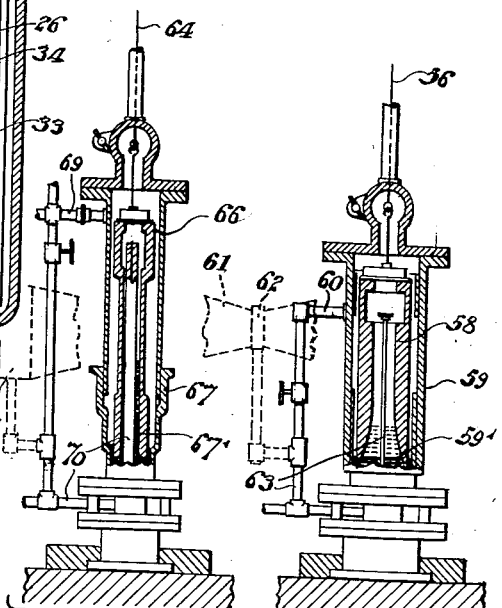
Figure 7:
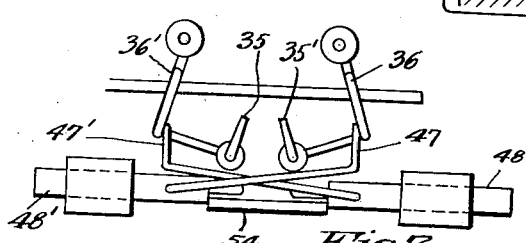

In the drawings, Fig. 1 is a front elevation of recording mechanism embodying my improvements; Fig. 2 is an enlarged fragmentary view of a portion of the pen disengaging means; Fig. 3 is a vertical sectional view on the center line of Fig. 1; Fig. 4 is a vertical sectional view on the line 4—4 of Fig. 3; Fig. 5 is a diagrammatic sectional view of part of a filter plant installation having a loss of head and rate of flow mechanism for effecting relative movements of the markers and chart; Fig. 6 is a perspective view on an enlarged scale of the pen disengaging means; and Fig. 7 is a plan view of the mechanism illustrated in Fig. 6.

In the embodiment of my invention illustrated in the drawings, a frame or casing 1 has hinged thereto a fenestrated closure 2 containing a sight-glass 3 for viewing a chart 4 mounted upon a carriage 5. The carriage is reciprocable longitudinally of the casing on anti-friction wheels 6 fixed to the rear of the bottom of the carriage and which ride on the rail 7; the top of the carriage being prevented from tipping by anti-friction rollers 8 which ride along the U-shaped rail 9.

A toothed rack 10 is formed on or fixed to the bottom of the carriage and meshes with a gear wheel 11 fixed to a sleeve 12 (Fig. 3) mounted in anti-friction bearings 13 and 14 carried by a bracket 15 supported by the frame.

A sheave 16, mounted on the hub 17 fixed to the sleeve 12, is rotatable by a weight 18 suspended from the cord 19 fixed to the sheave and tends to move the carriage 5 toward the right from its position shown in Fig. 1, the speed of descent of the weight being preferably controlled by a liquid containing tube 18' forming a dash pot.

The carriage is movable toward the left as a result of the rotation of the sleeve 12 by an arm 20 fixed thereto and having a tooth or boss 21 engaged by one of a pair of latches or triggers 22 pivotally connected to the rotatable arms 23. A semi-circular plate 24, carried by the frame or casing, engages the tails of the respective latches 22 during one-half the rotation of each latch so as to throw the nose of the engaged latch into the path of the stud 21 against the action of a corresponding spring 25 anchored to a pin 26. The spring tends to rock the latch 22 out of the path of the tooth 21 as soon as the tail of the latch clears the periphery of the plate 24. The disengagement of the latch 22 from the tooth 21 permits the return of the carriage 5 to the datum position as above described.

The arms 23 are rotated, to rotate the arm 20 during the engagement of a latch 22 with the periphery of the plate 24, by a hollow shaft 27 housed within the sleeve 12 and having fixed to the end thereof a plate 28 adjustably connected by a thumb screw 29 with a plate 30 fixed on the shaft 31. The shaft 31 is rotated, through a coupling 32, by the driving shaft 33 of suitable motor mechanism 34, such as an electrically operated or spring driven clock housed within the casing.

A plurality of pens or markers 35, 35' are mounted adjacent to the chart carriage upon bent rods 36, 36' which are looped over the top of the chart carriage and adjustably fixed to rods 37, 37' reciprocable in brackets 38. The intermediate portions of the rods 37, 37' (Fig. 1) have fixed or formed thereon toothed racks 39, 39' which are engaged and reciprocated by the toothed peripheries of the sheaves 40, 40' journalled on brackets 41, 41'. The sheaves 40, 40' are turned on their axes by belts 42, 42' which are connected with sheaves 43, 43' mounted on shafts 44, 44'. These shafts have fixed thereto pointers 45, 45' movable over the respective scales 46, 46'. The rod 37 may have fixed thereto a totalizer 37$^a$ having registers operable by the contact of a friction wheel 37$^b$ with the surface of a disk 37$^c$ rotatable at a constant rate from the clock 34 or other suitable source of power.

The pens 35, 35' are movable into and out of marking contact with the chart surface by the engagement of the members 36, 36' by rods 47, 47' having their lower ends fixed to reciprocable pins or triggers 48, 48' (Fig. 2) slidable in ways formed in the bracket 49. The pins 48' 48 have recessed ends for the engagement therewith of tapered arms 50, 50' fixed to a shaft 51 journalled in a bearing of the bracket 49 and having an arm 52 connected with an anchored spring 53 for throwing the arms 50, 50' to inclined positions on one side or the other of the vertical. An arm 54 fixed to the shaft 51 is adapted to be engaged by the lugs 55, 55' on the opposite ends of the chart carriage to throw the arms 50, 50' from one position to the other. When the chart carriage reaches one end of its stroke, the arm 54 is contacted by the lug 55' so as to throw it into the position shown in Fig. 2 and in which the rods 47 and 47' are withdrawn from the pen carrying members 36 and 36', respectively, so as to permit the pens or markers 35 and 35' to turn in contact with the chart. The necessary position of the triggers 48 and 48' for producing such effect is illustrated in Fig. 2. When, however, the chart reaches the other end of its travel, in the direction indicated by the arrow in Fig. 6, the rods 47 and 47' are pushed against the members 36 and 36' to withdraw the pens from the chart by the action of the lug 55 which contacts with the upper portion of the arm 54 to move it to the left, or in the direction of the arrow in Fig. 6. When the arm 54 passes the vertical position shown in Fig. 1, it is snapped over by the spring 53 into the position shown in Fig. 6, carrying with it the arms 50 and 50', thereby shoving the upper trigger 48 to the left and the lower trigger 48' to the right to spread the spring-carrying members 36 and 36'.

The sheaves 43, 43' are rotatable in any suitable manner but preferably by the connection therewith of loss of head and rate flow mechanism such as shown in Fig. 5.

The shaft 44 has fixed thereon a sheave 43$^a$ for a flexible cable 56 on which is suspended a counterweight 57 for counterbalancing a hollow shaped float 58 having its lower edge immersed in mercury 59' contained in the casing 59.

The casing 59 is connected through a pipe 60 with the main section 61' of a Venturi tube having a throat 62 communicating through the tube 63 with the chamber formed in the float, the tube outlet being above the mercury level.

The shaft 44' has fixed thereon a sheave 43$^a$' for a flexible cable 64 on which are suspended a counterweight 65 and a hollow shaped float 66 having its edge immersed in mercury 67' in the casing 67. The casing 67 communicates through a pipe 69 with a raw water reservoir directly above a filter bed (not shown) and the chamber within the float communicates through a tube 70 with an effluent pipe of the filter, such for instance as that containing the Venturi tube 61. The outlet of the tube 70 within the float is above the mercury level.

In the utilization of my improved apparatus for recording and indicating loss of head at a filter plant, differential pressures are communicated from the raw water reservoir and effluent pipe to the inner and outer surfaces of the shaped float 66, which is immersed to a greater or less extent in mercury by variations in the respective pressures and in simple functional proportion to variations in the head.

Similarly, in the utilization of my improved apparatus for recording indicating and registering rate of flow from a filter plant differential pressures are communicated from the throat and main section of the Venturi tube to the inner and outer surfaces of the shaped float 58 which is thereby immersed to a greater or less extent in the mercury in simple proportions to changes in the rate of flow through the Venturi tube.

Rotation of these wheels elevates or lowers the pen holding rods 36', 36 which moves the pens up and down in vertical or circular paths on the chart 4, and also moves the traction wheel 37$^b$ of the totalizer 37$^a$ toward or from the axes of the disk 37$^c$.

The chart is placed in its datum position as a result of the disengagement of a latch 22 from the control disk 24, which permits the weight 18 or a similarly acting spring to act through the parts above described to move the chart carrier to the right against an adjustable stop.

The clock mechanism thereupon moves a latch 22 into engagement with a curved periphery of the control plate 24 which throws the nose of the latch into engagement with the stud 21 on the arm 20. This arm is then advanced by the clock mechanism and acts through the parts described to advance the chart carrier along the rails so as to cause recording upon the chart of lines corresponding to the movements of the floats.

When the chart carrier approaches the limit of its movement toward the left, the detent 55 thereon engages the arm 54 and rocks it past dead center position. The spring 53 thereupon completes the throw and the arms 50, 50' move the pins 48, 48' to rock the rods 47, 47' and lift the pens from the chart surface. The tail of the dog 22 has meanwhile reached the end of the curved periphery of the plate 24 and is drawn by the spring 25 out of engagement with the tooth 21. The weight 18 thereupon again acts to retract the chart carrier, which in its movement causes the detent 55' to engage the arms 54 and throw it back to its original position so that the pens are again positioned to engage the chart surface.

By my improvements, there is provided a recording mechanism adapted for utilizing directly a chart having a record area on which may be plotted rectangular coordinates having their extremities spaced by the length of the record area during recording so as to render visible the whole recording surface. This chart cooperates with a suitable marker. Means are provided for effecting bodily movement of one of the devices relatively to the other in a substantially flat plane so as to mark the entire length of the record area during a desired period, and means are also provided for effecting movement of one of the devices transverse to the line of movement caused by the previous means. These relative movements of the marker and chart trace a graph, which is preferably formed only during the periodic movement of the movable device from its datum point to a terminus; the formation of a graph during movement in the reverse direction being avoided by disengagement of the marker and chart surface.

Having described my invention, I claim:

1. Recording mechanism comprising a chart having a recording surface forming a plane, a carrier for said chart, means for reciprocating said carrier to move the recording surface of said chart in a plane, a marker adapted to engage said chart, and means controlled by said carrier for disengaging said marker from said chart.

2. Recording mechanism comprising a reciprocable carriage, marking mechanism adapted to engage a chart on said carriage, and means operable by said carriage for disengaging said marking mechanism from said chart, said means being operable in the reverse direction by said carriage to permit the re-engagement of said chart by said marking mechanism.

3. Recording mechanism comprising a chart carrier, a straight rail for guiding said carrier, means for reciprocating said carrier along said rail, marking mechanism movable into and out of engagement with said carrier, and means comprising reciprocable pins actuated by said carrier for actuating said marking mechanism.

4. Recording mechanism comprising a chart carrier, motor mechanism for moving said carrier in one direction, a weight for moving said carrier in the reverse direction, and marking mechanism movable into engagement with a chart on said carrier by a movement of said carrier in one direction and out of engagement with said chart by movement of said carrier in the reverse direction.

5. Recording mechanism comprising a chart carrier, a sleeve, means connecting said sleeve and carrier, a weight connected with said sleeve for moving it in one direction, motor mechanism, and means for connecting said motor mechanism with said sleeve and including a control plate and a latch controlled by said plate for engaging said motor mechanism with and disengaging it from said sleeve.

6. Recording mechanism comprising a semi-circular plate, a latch controlled by said plate, chart operating mechanism, said latch being held in engagement with said mechanism by said plate, and motor mechanism connected with said chart operating mechanism by said latch.

7. Recording mechanism comprising a reciprocating chart carrier, a sleeve connected with said chart carrier, a weight for operating said sleeve, an arm on said sleeve, a rotary device adapted for engagement with said arm, and a curved plate controlling the engagement of said rotary device with said arm.

8. Recording mechanism comprising a chart carrier, a shaft connected with said chart carrier, a weight for moving said chart carrier in one direction, an arm fixed to said shaft, a rotary device, a latch adapted for engaging said rotary device and arm, and a curved plate controlling said latch.

9. Recording mechanism comprising a chart carrier, a shaft connected with said chart carrier and having an arm thereon, a rotary device having a latch adapted for engagement with said arm, a curved plate controlling said latch, a shaft connected with said rotary device and sleeved relatively to said shaft first named, a shaft adjustably connected with and sleeved relatively to said shaft second named, and a motor mechanism connected with said shaft last named.

MORO M. BORDEN.